US005666506A

United States Patent [19]

Hesson et al.

[11] Patent Number: 5,666,506
[45] Date of Patent: Sep. 9, 1997

[54] APPARATUS TO DYNAMICALLY CONTROL THE OUT-OF-ORDER EXECUTION OF LOAD/STORE INSTRUCTIONS IN A PROCESSOR CAPABLE OF DISPATCHING, ISSUING AND EXECUTING MULTIPLE INSTRUCTIONS IN A SINGLE PROCESSOR CYCLE

[75] Inventors: James Henry Hesson; Jay LeBlanc; Stephen J. Ciavaglia, all of Chittenden County, Vt.

[73] Assignee: International Business Machines Corporation, Armonk, N.Y.

[21] Appl. No.: 440,025

[22] Filed: May 12, 1995

Related U.S. Application Data

[62] Division of Ser. No. 328,185, Oct. 24, 1994, abandoned.
[51] Int. Cl.$^6$ .................................................. G06F 9/38
[52] U.S. Cl. ................................... 395/392; 395/394
[58] Field of Search .................................. 395/375, 800, 395/585, 394, 392

[56] References Cited

U.S. PATENT DOCUMENTS

| | | | |
|---|---|---|---|
| 4,481,576 | 11/1984 | Bicknell | 395/421.07 |
| 5,261,071 | 11/1993 | Lyon | 395/467 |
| 5,323,489 | 6/1994 | Bird | 395/494 |
| 5,325,505 | 6/1994 | Hoffecker et al. | 395/612 |
| 5,442,757 | 8/1995 | McFarland et al. | 395/394 |
| 5,511,175 | 4/1996 | Favor et al. | 395/392 |
| 5,530,958 | 6/1996 | Agarwal et al. | 395/403 |

Primary Examiner—William M. Treat
Assistant Examiner—Kenneth R. Coulter
Attorney, Agent, or Firm—Whitham, Curtis, Whitham & McGinn; Susan M. Murray

[57] ABSTRACT

An apparatus to dynamically controls the out-of-order execution of load/store instructions by detecting a store violation condition and avoiding the penalty of a pipeline recovery process. The apparatus permits a load and store instruction to issue and execute out of order and incorporates a unique store barrier cache which is used to dynamically predict whether or not a store violation condition is likely to occur and, if so, to restrict the issue of instructions to the load/store unit until the store instruction has been executed and it is once again safe to proceed with out-of-order execution. The method implemented by the apparatus delivers performance within one percent of theoretically possible with apriori knowledge of load and store addresses.

1 Claim, 4 Drawing Sheets

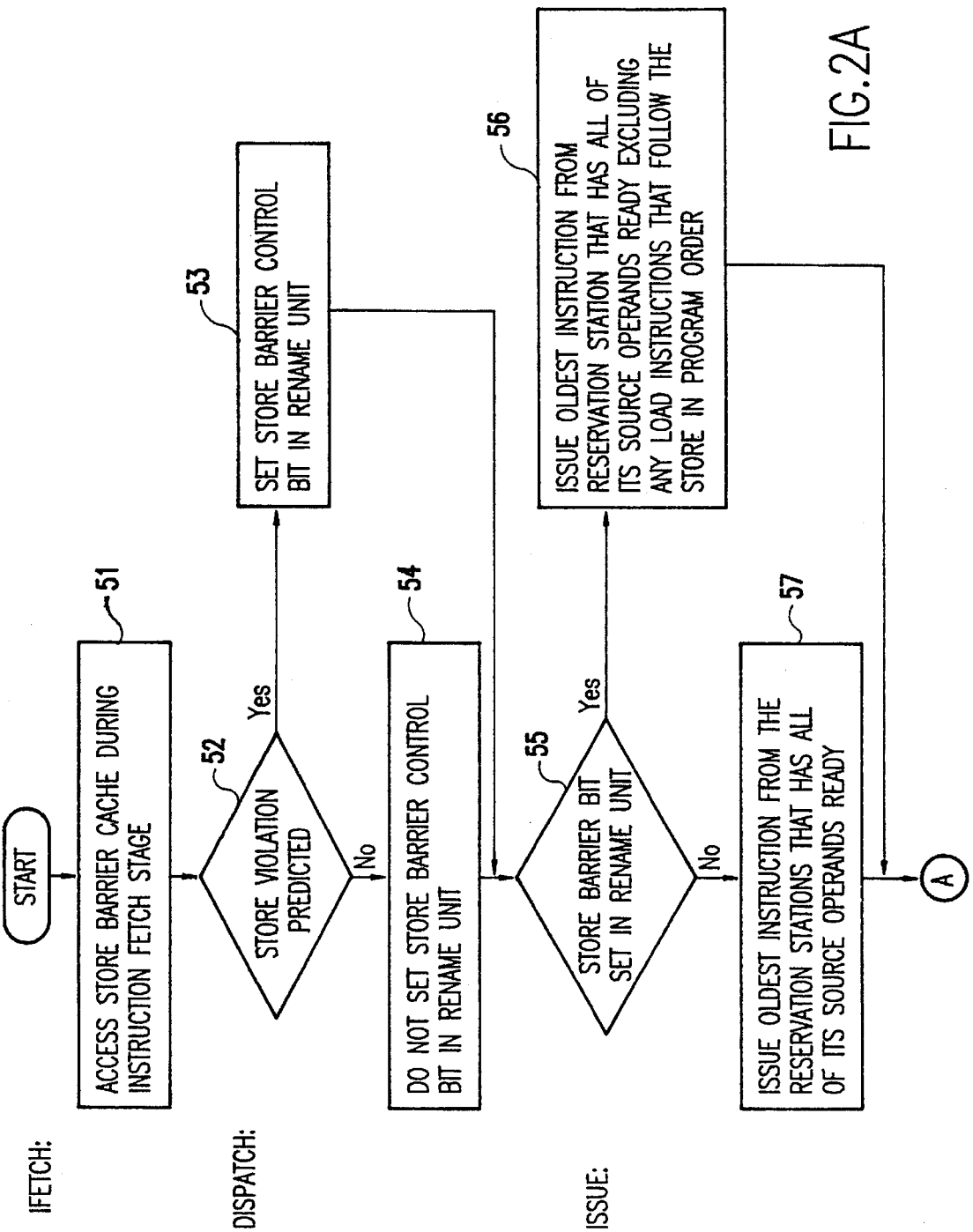

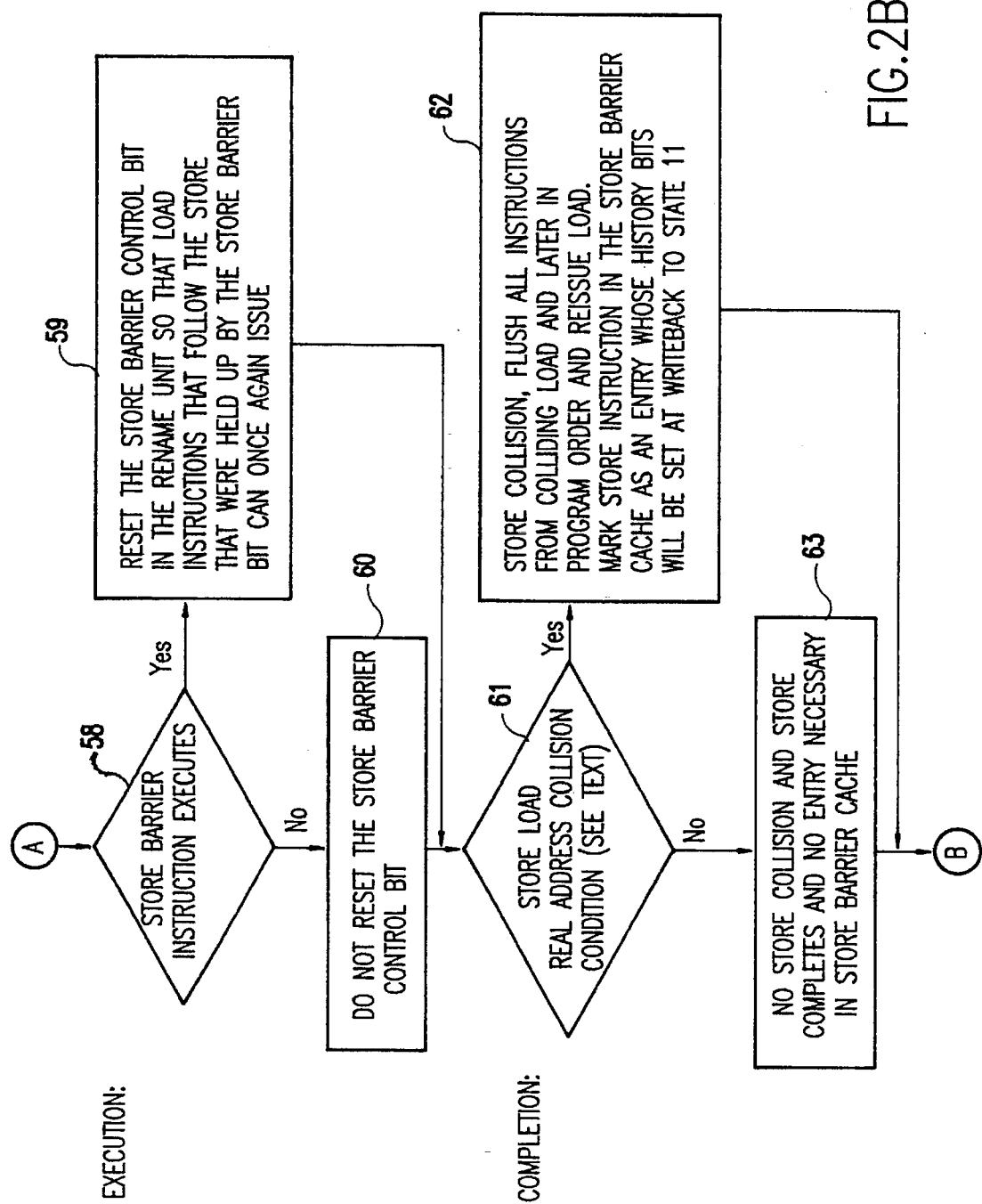

APPARATUS TO DYNAMICALLY CONTROL THE OUT-OF-ORDER EXECUTION OF LOAD/STORE INSTRUCTIONS IN A PROCESSOR CAPABLE OF DISPATCHNG, ISSUING AND EXECUTING MULTIPLE INSTRUCTIONS IN A SINGLE PROCESSOR CYCLE This application is a divisional of application Ser. No. 08/328,185, filed Oct. 24, 1994 now abandoned.

CROSS-REFERENCE TO RELATED APPLICATION

The subject matter of this application is related to that of copending patent application Ser. No. 08/328,184 filed concurrently herewith by J. Hesson et al. for Apparatus to Perform Source Operand Dependency Analysis, Perform Register Renaming and Provide Rapid Pipeline Recover for Microprocessor Capable of Issuing and Executing Instructions Out-of-Order in a Single Processor Cycle (IBM Docket FI9-94-088) and assigned to a common assignee. The disclosure of application Ser. No. 08/328,185 is incorporated herein by reference.

DESCRIPTION

BACKGROUND OF THE INVENTION

1. Field of the Invention

The present invention generally relates to the control of instructions to a pipelined processor of a stored program data processing machine and, more particularly, to an apparatus for controlling the instruction dispatch, issue, execution and memory update of a microprocessor capable of executing multiple instructions out-of-order every machine clock cycle.

2. Description of the Prior Art

A microprocessor that is capable of issuing and executing machine instructions out of order will in general permit loads to be executed ahead of stores. This feature permits a large performance advantage provided that the load address and the store address do not both have the same physical address. In typical programs, the frequency that a load proceeds ahead of the store and that their physical address matches is low. However, since the discovery of this store violation condition is typically late in the instruction execution pipeline, the recovery penalty can be quite severe. The recovery process typically involves invalidating the load instruction that caused the violation and all newer instructions in program order beyond the load instruction, and second reissuing the load instruction.

One approach to solve this problem in the prior art for a machine capable of executing instructions out of order was to permit only nonload/store instructions to execute out of order and restrict load and store instructions to execute in order. A second approach utilized in the prior art was to speculatively execute load/store instructions as well as nonload/store instructions and to perform collision recovery only when necessary. A third approach was to permit the load to execute only when it is determined safe to do so.

SUMMARY OF THE INVENTION

It is therefore an object of the present invention to provide an apparatus to dynamically control the out-of-order execution of load/store instructions which detects a store violation condition and avoids the penalty of a pipeline recovery process.

According to the preferred embodiment of this invention, there is provided an improved apparatus for permitting load and store instruction issue and execute out of order. The apparatus incorporates a unique store barrier cache which is used to dynamically predict whether or not a store violation condition is likely to occur and, if so, to restrict the issue of instructions to the load/store unit until the store instruction has been executed and it is once again safe to proceed with out-of-order execution. The method implemented delivers performance within one percent of theoretically possible with apriori knowledge of load and store addresses.

BRIEF DESCRIPTION OF THE DRAWINGS

The foregoing and other objects, aspects and advantages will be better understood from the following detailed description of a preferred embodiment of the invention with reference to the drawings, in which:

FIGS. 2A, 2B and 2C, taken together, are a flow diagram showing the logic of the method implemented by the apparatus of FIG. 1.

DETAILED DESCRIPTION OF A PREFERRED EMBODIMENT OF THE INVENTION

Figure 1:
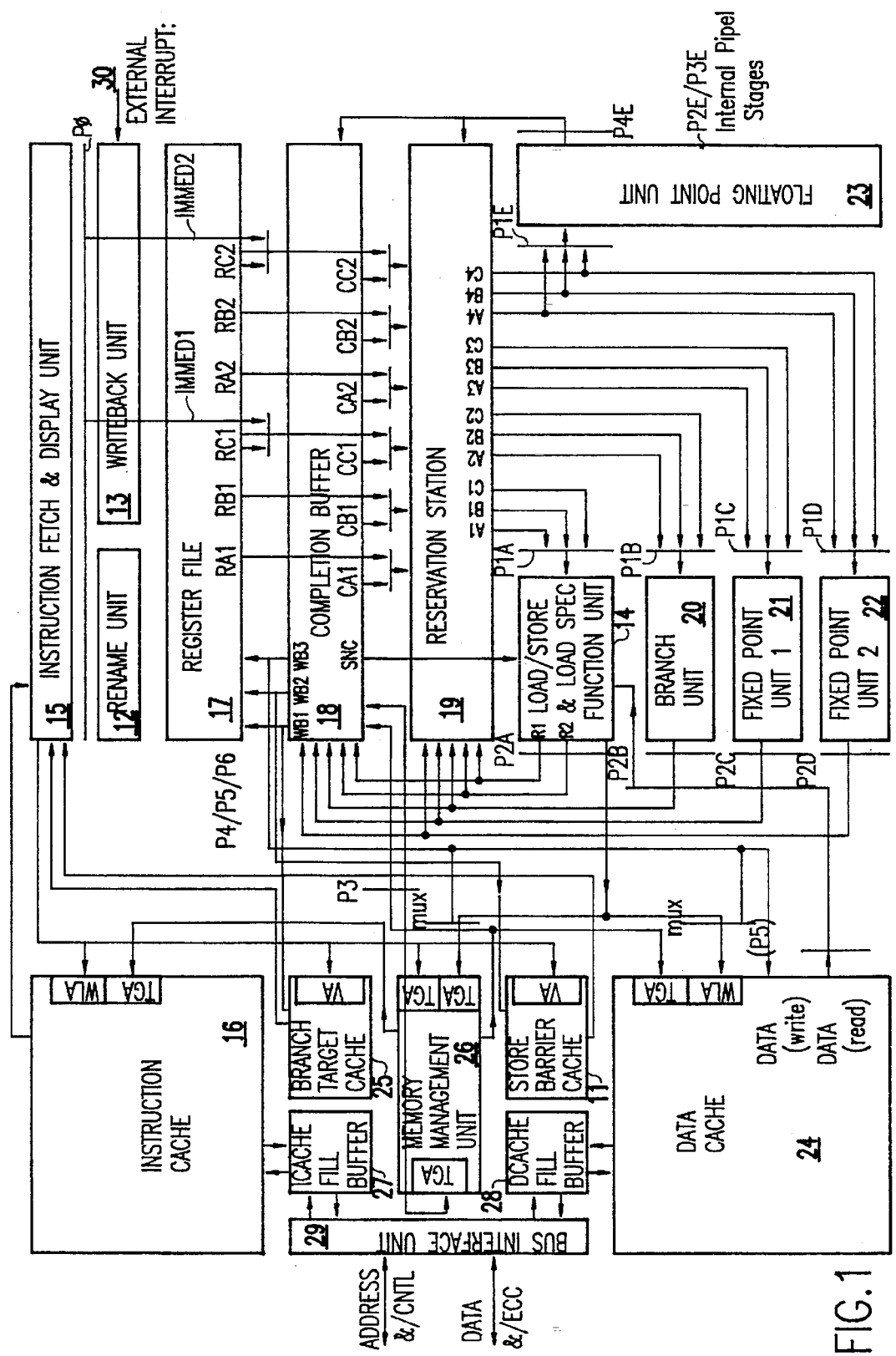
FIG. 1 is a block diagram of a superscaler microarchitecture that incorporates store barrier cache apparatus.

Referring now to the drawings, and more particularly to FIG. 1, there is shown a superscalar microarchitecture that incorporates a unique store barrier cache apparatus 11 as well as other functional units typical of a superscaler processor. More particularly, the superscalar processor includes a bus interface unit 29 which communicates with a system bus (not shown) to receive and transmit address and control codes and to receive and transmit data and error correcting codes (ECC) or byte parity information. The address and control codes are buffered by instruction cache (ICACHE) fill buffer 27 and input to the instruction cache 16. The data and ECC are buffered by data cache (DCACHE) fill buffer 28 and input to the data cache 24. Memory management unit (MMU) 26 controls the writing to and reading out of instructions and data, respectively, for both the instruction cache 16 and the data cache 24.

The superscalar microarchitecture further contains multiple fixed point execution units 21 and 22, a dedicated branch processor 20, a dedicated load/store unit 14, and a floating point unit 23. Instructions are fetched from the instruction cache 16 to the instruction fetch and dispatch unit 15 under the control of the rename unit 12 and dispatched to the central pool of reservation station buffers 19. During the dispatch of instructions from the instruction fetch buffer dispatch window, the destination result field of the instruction is renamed and the most recent copy of the source operands are either tagged or supplied along with any instruction control bits to the reservation station entry identified by the rename tag. The execution units 14, 20, 21, 22, and 23 are directed by the rename unit 12 to perform the oldest instruction that has each of its operands valid from one of the four reservation ports. The four reservation ports are sourced to the execution units from the central pool of reservation station buffers 19 and the execution units direct the computed results to the completion buffer 18 entry pointed to by the destination tag assigned by the rename unit 12. As reservation station buffers 19 and completion buffer 18 entries are assigned in pairs during the dispatch stage by the rename unit 12, they share the same tag. The writeback unit 13 writes the computed results from the completion buffer 18 back to the architected register or to memory in program order under the direction of the rename unit. In the case of the branch execution unit 20, the computed result is written from the completion buffer 18 to the branch target cache 25 which is accessed by the instruction fetch and dispatch unit 15.

The pipelined stages for each of the major type of machine instructions is illustrated in FIG. 1. For example, the data store operation consists of six stages: instruction fetch, instruction dispatch, address generation (i.e., execution stage), memory translation lookaside buffer (TLB) and cache hit/miss search, completion (i.e., write cache and TLB results to completion buffer), and finally writeback to cache.

| Data Store Instruction | Data Load Instruction |
| --- | --- |
| P0 •Instruction Fetch | P0 •Instruction Fetch |
| P1 •Dispatch | P1 •Dispatch |
| P2 •Address Generation | P2 •Address Generation |
| P3 •Memory Table Search | P3 •Memory Read |
| P4 •Complete | P4 •Complete |
| P5 •Writeback (to DCACHE) | P5 •Writeback (RF) |

| Fixed Point Instruction | Floating Point Instruction |
| --- | --- |
| P0 •Instruction Fetch | P0 •Instruction Fetch |
| P1 •Dispatch | P1 •Dispatch |
| P2 •Execute | P2 •Execute 1 |
| P3 •Complete | P3 •Execute 2 |
| P4 •Writeback | P4 •Execute 3 |
|  | P5 •Complete |
|  | P6 •Writeback |

In the foregoing table, the numbers with the prefix "P" designate stages in the pipeline. Thus, the P0 pipeline stage is the instruction fetch stage, the P1 pipeline stage is the dispatch stage, and so forth.

The store barrier cache 11 works in conjunction with the instruction fetch and dispatch unit 15, the rename unit 12, the load/store and load special function unit 14, and the writeback unit 13 to obtain a significant performance advantage over the prior art by permitting speculative execution of load and store instructions. The store barrier cache 11 is accessed in parallel with the instruction cache 16 and contains history bits that are used to predict the condition wherein a load instruction has executed ahead of a store instruction in program order and that the load and store instruction have the same real address. If the store barrier cache 11 predicts a store load conflict, this information is used during the dispatch of the store instruction to mark a barrier bit within the rename unit 12 so that no loads in program order are permitted to execute ahead of the store that is predicted to be violated. In this fashion, aggressive out-of-order instruction execution is enabled with the accompanying performance advantages.

The store barrier cache 11 dynamically predicts whether or not a store violation condition is likely to occur and if so restricts the issue of instructions to the load/store unit 14 to program order until the store instruction has been executed and it is once again safe to proceed with out-of-order execution. A store violation condition is defined as the situation wherein a load instruction that follows a store instruction in program order executes ahead of the store and produces the same real address. When this store violation condition occurs, incorrect program behavior results and a potentially costly pipeline recovery process is required.

The store barrier cache line entry Table 1 consists of the virtual address of a store which was previously violated, a valid bit, history bits which are updated during the writeback stage of the pipeline according to the persistence of the store violation condition, and least recently used (LRU) bits according to the associativity of the store barrier cache 11.

TABLE 1

| STORE BARRIER CACHE LINE ENTRY | | | | |
| --- | --- | --- | --- | --- |
| Virtual Address Tag | Word (byte) Offset | Valid | History 1-0 | LRU |

The store barrier cache history bits are used to record the state of the persistence condition for each store barrier cache entry. Table 2 illustrates one possible algorithm for the update of the history bits.

TABLE 2

STORE BARRIER CACHE HISTORY BIT UPDATE

| barrier not predicted 00 | →  barrier occurred  ← barrier did not occur | barrier not predicted 01 | →  barrier occurred  ← barrier did not occur | barrier not predicted 10 | →  barrier occurred  ← barrier did not occur | barrier not predicted 11 |

The store barrier cache operation is now described as a store instruction proceeds through the instruction pipeline. As mentioned above, the store barrier cache entry contains the violated store instruction address and history information on the presistence of a violated store condition. During the instruction fetch pipeline stage 15, the store barrier cache 11 is accessed in parallel with the instruction cache 16 and branch target cache 25.

The store barrier cache 11 performs a comparison of the next instruction prefetch fetch buffer virtual address against the virtual instruction address field in each of its cache entries. In general, the store barrier hit is defined as a match of the next instruction virtual address with the store barrier cache virtual address field and the condition that the store barrier bit is asserted. There may be more than one store barrier hit within the instruction fetch buffer specified by the next instruction prefetch buffer virtual address. Therefore, the store barrier cache output that is produced is the first store barrier cache hit within the store barrier cache line that is greater than or equal to the next instruction prefetch buffer address. If a store barrier cache hit results from the next instruction prefetch buffer virtual address, then the store barrier cache hit control output is a logic one. If no match is found, then the store barrier cache hit control output is a logic zero.

During the dispatch stage, the store barrier information is used to set a control bit in the rename unit 12 to indicate that a store violation condition has been predicted by the store barrier cache 11. The rename unit 12 is in charge of allocating and deallocating paired reservation station and completion buffer entries. The rename unit 12 maintains a stack order of most recently dispatched to least recently dispatched instruction and instructions are dispatched in order from the instruction fetch buffer 15. Reservation station and completion buffer tags are assigned from a pool of tags so that multiple writes to a given architected register from the register file 17 can be dispatched to the reservation station buffers 19.

The rename unit 12 is also used to perform local operand dependency checks within the current instruction fetch dispatch buffer 15 as well as on a global basis similar to a classical scoreboard so that the most recent result tag is assigned to an instruction source operand as it is dispatched. The rename unit 12 is also utilized to control the issue of the oldest instruction that has all of its operands valid within the reservation station 19 to the appropriate functional unit, e.g., data load/store unit 14, branch unit 20, fixed point unit 21, fixed point unit 22, and floating point unit 23. The rename unit 12 is also utilized by the writeback unit 13 to writeback a completed instruction in program order and during pipeline recovery operations such as recovery from a mispredicted branch, during an external interrupt 30, servicing of a fast trap sequence (e.g., a renormalization of a floating point denormal), or pipeline recovery of a mispredicted branch of pipeline recovery of a store barrier collision. In each of these cases, as the microarchitecture is capable of speculative execution, the incorrect instructions are flushed and the recovery begins at the next valid instruction. As the rename unit 12 maintains program order via a stack of all instructions in program order after the collision or mispredicted branch can be instantly flushed.

Those skilled in the art will recognize that the concept of renaming is not new. However, the preferred rename unit is that which is disclosed in copending application Ser. No. 08/328,184 referenced above. It should be understood for the purposes of practicing this invention, it is not necessary that the store barrier cache be tied to the specific rename unit disclosed in application Ser. No. 08/328,184. Another rename unit could also be updated to accommodate the concept of a store barrier cache. Other rename units will in general not be able to perform the partial flush as fast as the preferred rename unit.

If classical register scoreboarding is utilized versus register renaming only, one pending write to an architected register is possible. Out of order execution is still possible with scoreboarding; however, the single write to an architected register yields a significant performance constraint on the issue of instructions to the functional units 14, 20, 21, 22, and 23 and their subsequent execution. In any case, the store barrier mechanism is viable for either dispatch of instructions via renaming or classical scoreboarding.

Store violation and violation persistence history information is used to control the dispatch of instructions by the rename unit 12 in such a manner as to prevent all load instructions from issuing until the store instruction that had previously been violated has successfully proceeded through the execution stage of the instruction pipeline. Indeed, the store barrier condition is used as a instruction dispatch filter to permit arithmetic and logical condition from proceeding but not subsequent load instructions. The store instruction is permitted to execute once all its dependencies including the store data are resolved. Load instructions are once again permitted to proceed after the violated store instruction has executed and, as a result, not request the cache memory location that the store instruction is about to updated. Since the store instruction may not have written the data back to the cache memory, a load snoop special function unit 14 is employed to cover for this condition and perform load data forwarding. Permitting all load instructions to proceed after the store instruction has executed versus after it has written back has two benefits. First, all load instructions are held up at the instruction issue stage a minimum amount of time and, second, history information on the persistence or lack of persistence of this store violation condition is provided. By dynamically controlling the issue and execution of load instructions according to a single violation condition and its history information using the store barrier cache 11, significant performance advantages are achieved over the prior art.

The writeback unit 13 is responsible for the store barrier cache 11 history update, the branch target cache 25 target history update information, writeback of store results to the cache 24 in the case of uncachable stores (video frame buffer) to a store writeback buffer (not shown) and the writeback of completed results to the register file 17. Whenever the store instruction writes back the formatted store data, persistence of a store violation condition is monitored by comparing the store address against all newer load instructions that have completed. If the condition persists, the store barrier violation control bit is left in tact in the store barrier cache 11. If the store violation condition is not detected when the store instruction data is about to be written back to memory, the store barrier history bits are updated. The preferred embodiment uses two history bits so that the store barrier control bit is deasserted when two successive writebacks of store instruction data exhibit no violation condition, as indicated in Table 2. Other history bit update algorithms are certainly possible and are an obvious extension of the basic concept.

The pseudocode below summarizes the essential operation of the store barrier cache 11 to facilitate aggressive speculative execution in a superscaler microprocessor capable of executing multiple instructions out of order.

| PSEUDO CODE FOR STORE BARRIER CACHE OPERATION |
| --- |
| IFETCH: {access store barrier cache during instruction fetch stage} |
| DISPATCH: |
|   IF {store violation is predicted} |
|   THEN {set store barrier bit in rename cam} |
|   ELSE {do not set store barrier bit} |
| ISSUE: |
|   IF      {store barrier bit is set in rename cam entry corresponding to that store) |
|   THEN  {issue oldest instruction from the reservation stations that has all of its operands ready and excluding any load instruction that follow the store in |

| PSEUDO CODE FOR STORE BARRIER CACHE OPERATION | |
|---|---|
| | program order} |
| ELSE | {issue oldest instruction from the reservation stations that has all of its operands ready} |
| EXECUTION: | |
| IF | {store barrier instruction executes} |
| THEN | {reset store barrier bit in rename cam entry so that load instructions that follow the store that were marked by the store barrier bit can once again issue} {find next oldest rename cam entry with store barrier bit} |
| ELSE | {do not reset store barrier bit} |
| COMPLETION: | |
| IF | {store instruction does not detect a load instruction that ran ahead of it when the store instruction address and the formatted store operand are written to the completion buffer} |
| THEN | {no store collision, and store is ok} |
| ELSE | {store collision, and flush all instructions from colliding load and later in program order and reissue load} {mark store as a store barrier cache entry whose history bits will be set at writeback to state 11} |
| WRITEBACK: | |
| IF | {store instruction that predicted a store violation does not detect a load address collision in a associative search of all load instructions that occur later in program order} |
| THEN | {update store barrier cache history with a barrier did not detect. Note: two successive clear conditions are required to remove the store barrier entry in the store barrier cache} {store instruction address is used to writeback formatted data to memory} |
| ELSE | {store that had no collision this time around} {store instruction address is used to writeback formatted data to memory} |

Figure 2C:
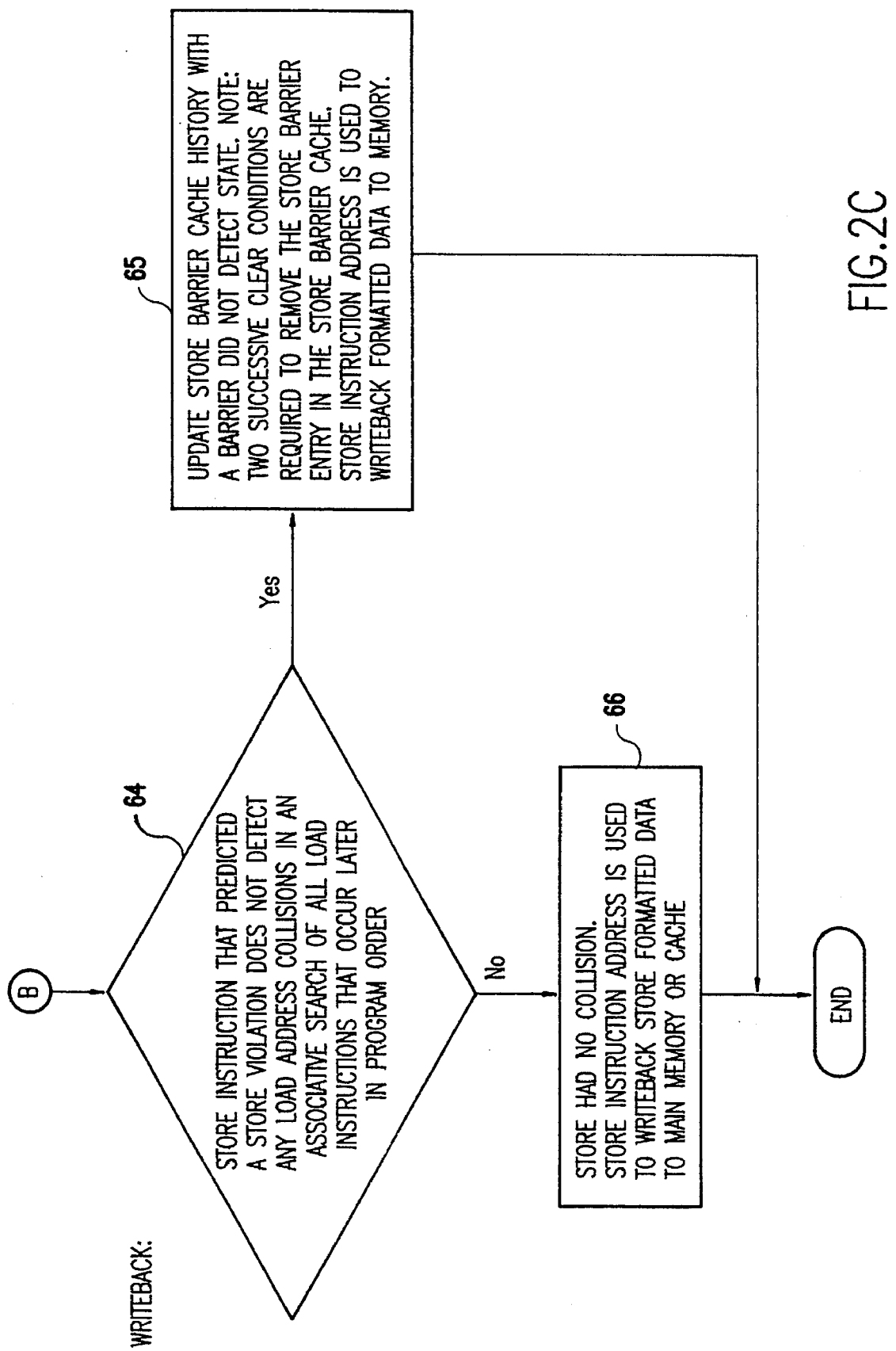

The store barrier cache barrier cache operation is illustrated in FIGS. 2A to 2C. Referring first to FIG. 2A, at IFETCH, the store barrier cache 11 is accessed in function block 51. At DISPATCH, a test is made in decision block 52 to determine if a store violation is predicted. If so, the store barrier control bit is set in the rename unit 12 in function block 53; otherwise, the store barrier control bit is not set, as indicated in function block 54. Then, at ISSUE, a test is made in decision block 55 to determine if the store barrier bit has been set in the rename unit 12. If so, the oldest instruction is issued from the reservation station buffers 19 that has all of its source operands ready excluding any load instructions that follow the store in program order, as indicated in function block 56. If not, the oldest instruction is issued from the reservation stations that has all of its source operands ready, as indicated in function block 57.

Turning next to FIG. 2B, at execution, a test is made in decision block 58 to determine if the store barrier instruction executes. If so, the store barrier control bit is reset in the rename unit 12, as indicated in function block 59, so that load instructions that follow the store that were held up by the store barrier bit can once again issue. Otherwise, the store barrier bit is not reset in function block 60. At completion, a test is made in decision block 61 to determine if the there is a store load real address collision condition. If so, the collision is stored in function block 62, then all instructions are flushed from the colliding load and later in program order, and the load is reissued. The store instruction is marked in the store barrier cache 11 as an entry whose history bits will be set at writeback to state "11". However, if there is no collision condition, the store completes normally in function block 63, and no entry is necessary in the store barrier cache 11.

In FIG. 2C, at writeback, a test is first made in decision block 64 to determine if the store instruction that predicted a store violation does not detect any load address collisions in an associative search of all load instructions that occur later in program order. If so, the store barrier cache history is updated to reflect that a barrier did not detect any load address collisions. Note, however, that two successive clear conditions are required to remove the store barrier entry in the store barrier cache. The store instruction address is used to writeback formatted data to memory. Otherwise, the store has no collision, as indicated in function block 66. The store instruction address is used to writeback store formatted data to main memory or cache.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method of issuing and executing instructions out-of-order in a pipelined microprocessor in a single processor cycle comprising the steps of:

storing history bits in a store barrier cache to predict store load conflict;

issuing and dispatching a load and store instruction out of order;

marking a store instruction during a dispatch pipeline stage so that no loads in program order are permitted to execute ahead of the store that is predicted to be violated;

executing a dispatched load and store instruction; and accessing the store barrier cache to dynamically predict whether or not a store violation condition is likely to occur and, if so, restricting the issue of instructions until the store instruction has been executed and it is once again safe to proceed with out-of-order execution.

* * * * *